United States Patent

Hays, Jr.

(10) Patent No.: US 6,499,571 B1
(45) Date of Patent: Dec. 31, 2002

(54) BRAKE PAD WITH IMPROVED GREEN PERFORMANCE

(75) Inventor: William D. Hays, Jr., Rock Hill, SC (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/876,473

(22) Filed: Jun. 7, 2001

(51) Int. Cl.[7] .............................................. F16D 69/00
(52) U.S. Cl. ............... 188/251 A; 188/257; 188/250 B; 188/73.1
(58) Field of Search .................... 188/251 R, 251 M, 188/256, 257, 259, 251 A, 250 G, 250 B, 73.1

(56) References Cited

U.S. PATENT DOCUMENTS

| | | | |
|---|---|---|---|
| 3,585,102 A | * 6/1971 | Burgess | 188/251 M |
| 3,751,330 A | * 8/1973 | Gilbert | 188/250 G |
| 3,899,050 A | 8/1975 | Savary et al. | |
| 4,775,705 A | 10/1988 | Parker et al. | |
| 5,693,402 A | 12/1997 | Chwastiak et al. | |
| 5,858,883 A | 1/1999 | Lam et al. | |
| 5,971,113 A | 10/1999 | Kesavan et al. | |
| 6,167,992 B1 | * 1/2001 | Torpey et al. | 188/250 G |
| 6,213,260 B1 | * 4/2001 | Sirany et al. | 188/250 B |
| 6,378,670 B1 | * 4/2002 | Kawakami et al. | 188/251 A |

FOREIGN PATENT DOCUMENTS

GB    2148424 A    * 5/1985

* cited by examiner

Primary Examiner—Christopher P. Schwartz
Assistant Examiner—Xuan Lan Nguyen
(74) Attorney, Agent, or Firm—Carlson, Gaskey & Olds

(57) ABSTRACT

A brake pad comprises a first pad layer made of a first friction material and a second pad layer made of a second friction material different from the first friction material and operatively mounted to the first pad layer The first pad layer has a higher level of friction initially and the second pad layer has a higher level of friction after wearing and the first pad layer is less wear resistant than the second pad layer. As the first pad layer wears away, the second pad layer commences to wear or "break-in." Because the wearing is uneven at the interface, portions of the first pad layer continue to offer an immediate and higher level of friction as portions of the second pad layer "break-in" gradually to offer the high level of friction. Eventually, the first pad layer wears away, leaving the second pad layer already "broken-in" for a long-lasting life. Moreover, an intermediate layer with moderate levels of wear and friction can serve as a transition layer between the first pad layer and the second pad layer.

10 Claims, 4 Drawing Sheets

BRAKE PAD WITH IMPROVED GREEN PERFORMANCE

BACKGROUND OF THE INVENTION

The present invention relates to a method for improving the performance of brake pads of a vehicle braking system.

Brake pads are generally designed for durability. However, to obtain long-life, brake pads of current brake systems employ friction materials that require a "break-in" period before the pads can provide a high level of friction. As a consequence, vehicle braking may vary between the commencement of the "break-in" period, when the brake pads are "green", and following this period.

Inconsistent levels of friction are generally not desired by drivers. Moreover, drivers are frequently unable to "break-in" brake pads in a manner to ensure high performance. Accordingly, several means have been developed by manufacturers to overcome these problems.

One such method is to burnish the brake pads prior to their installation on the vehicle's brake system. This method involves placing the brake pads on a rotor and brake assembly and engaging the brakes until the surface of the pads have been "broken-in".

This method is undesirable because it requires significant effort to undertake.

Another method involves scorching the surface of the friction material. A laser, flame or heated plate is used to heat the surface of the brake pad. The heat alters the surface of the pad and increases its coefficient of friction. However, this method is both expensive and labor-intensive.

Finally, a coating may be applied to the surface of the brake pad to increase the level of friction on the pad during the "break-in" period. The coating is applied by spraying the pad with particles to a predetermined thickness. The coating requires additional labor and equipment to apply.

A need therefore exists for brake pads that offer a high level of friction immediately as well as over the life of the brake pad without significant expense or manpower to create.

SUMMARY OF THE INVENTION

In a disclosed embodiment of this invention, the brake pad comprises two pad layers. The two pad layers are made of different friction material and are formed together. The first pad layer is the pad layer initially in contact with the brake rotor of a brake system while the second pad layer comes into contact with the brake rotor only after wearing of the first pad layer. The second pad layer is mounted to a brake plate, which is operatively connected to the same brake system.

The first pad layer is made of a friction material that wears at a faster rate than the friction material of the second pad layer. Without the constraint of durability, the first pad layer can be composed of material that offers a higher level of friction immediately rather than after wear or "break-in". Organic, metallic, semi-metallic and glass materials all offer immediately higher levels of friction but wear at a faster rate than standard friction material. The first pad layer may be significantly thinner than the second pad layer.

As the first pad layer wears away, the second pad layer commences to wear or "break-in." Because the interface between the first pad layer and the second pad layer is uneven, the pad layers will wear unevenly at their interface. As a consequence, portions of the first pad layer continue to offer initially a higher level of friction as portions of the second pad layer "break-in" gradually to offer a high level of friction. Eventually, the first pad layer wears entirely away, leaving a second pad layer already "broken-in" and ready for long-lasting life.

The present invention is manufactured with very little labor or expense. No additional or specialized manufacturing equipment is required either. Accordingly, the invention provides a cost-effective and efficient means to avoid the "break-in" period required of new brakes.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
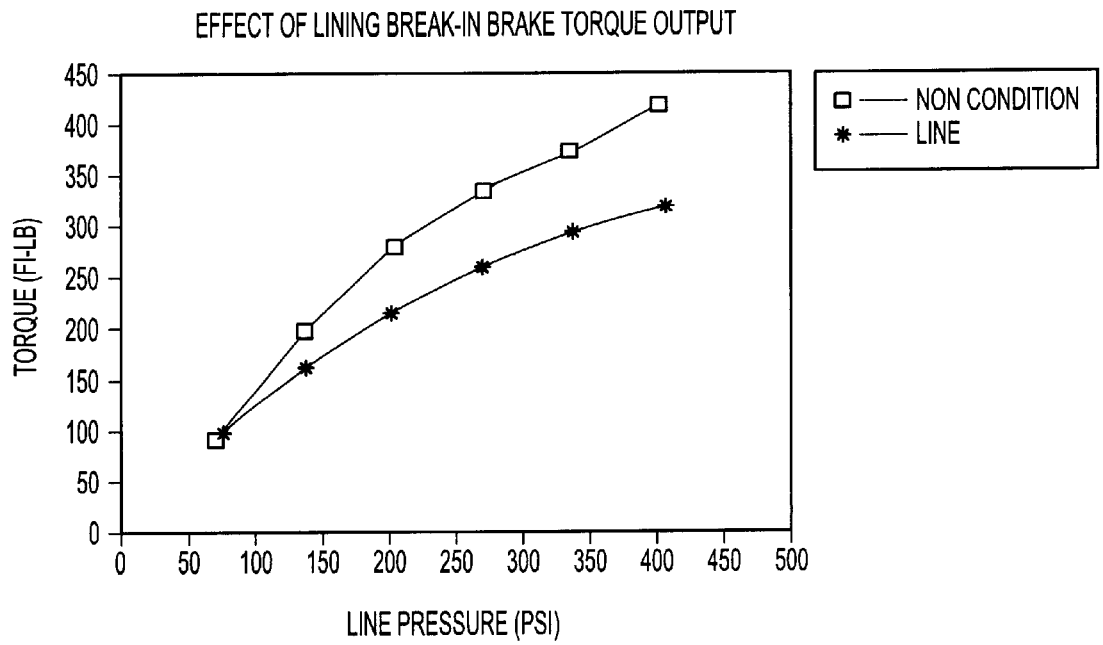
FIG. 1 shows the effect of "break-in" on brake torque output.

Brake pads are generally designed for durability. However, to obtain long-life, current brake pads employ friction materials that require a "break-in" period before the pad provides a high level of friction. FIG. 1 shows the effect of "break-in" on Brake Torque Output. The torque output of a new condition brake pad is compared to the torque of the same "after use" or "broken-in" brake pad and both plotted against pressure on the brake lining. The torque of the new condition brake pad is shown as a solid line while the torque of the "broken-in" brake pad is shown as a dashed line. As seen in FIG. 1, new condition brake pads have less torque output than the same after use or "broken-in" brake pads for any given level of line pressure.

Figure 2:
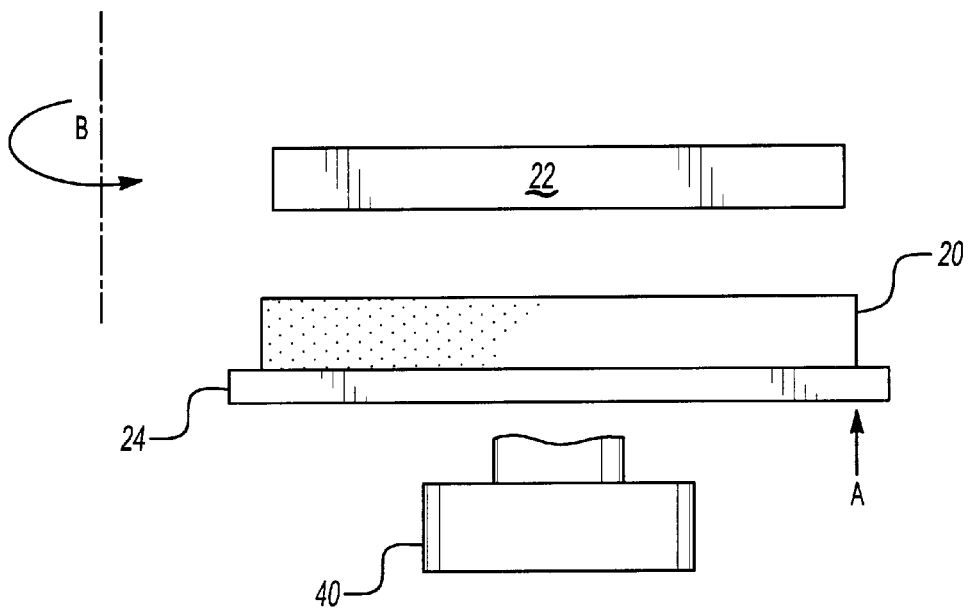
FIG. 2 shows a side view of brake pads known in the art.

FIG. 2 shows a side view of a brake pad as known in the prior art. Brake pad 20 is mounted on brake plate 24 by a method known in the art such as an adhesive bond.

Brake pad 20 is composed of a friction material. Brake rotor 22 also known in the art is shown. Brake plate 24 is operatively connected to brake system 40. When the brake is actuated, brake system 40 moves brake plate 24 in the direction of arrow A towards brake rotor 22. Contact is made with brake pad 20 and brake rotor 22, slowing the movement of brake rotor 22, which is typically rotational along axis B.

Figure 3:
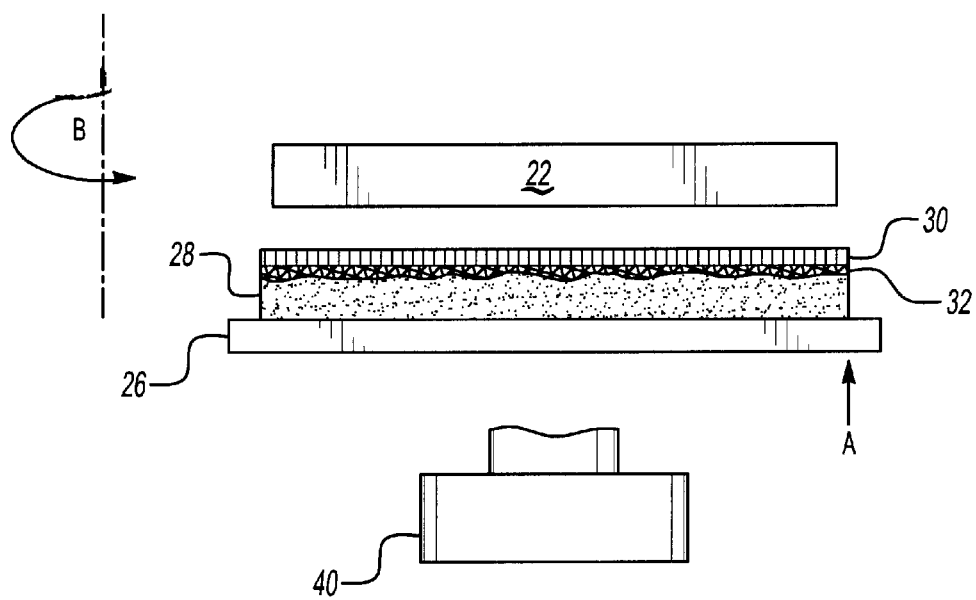
FIG. 3 shows a side view of an embodiment of the present invention.

FIG. 3 shows a side view of the present invention. First pad layer 30 made of a first friction material is mounted to second pad layer 28 made of a second friction material different from the first material by a method known in the art such as molding with a compatible adhesive binder in the two materials. Both pad layers may also be mounted together by adhesive to form a single brake pad, although for reasons made apparent below, this method is less preferable to molding these pad layers together. Alternatively, the pad layers may be combined together by other means already known in the art. Second pad layer 28 is itself operatively mounted to brake plate 26. Brake plate 26 is operatively connected to brake system 40. The actuation of the brake causes braking system 40 to move first pad layer 30 and second pad layer 28 in the direction of arrow A toward brake rotor 22, which typically moves rotationally along axis B.

First pad layer 30 is made of first friction material that wears at a faster rate than the second friction material of second pad layer 28. However, the first friction material initially offers a higher level of friction in contrast to the second friction material that offers durability and a higher level of friction only after wear. The first friction material of the first pad layer 30 can be made of an organic, metallic, semi-metallic materials such as rubber, cellulose, aramid, metallic composition, glass, or other used material that has properties of quick wear and initially high levels of friction.

Generally, first pad layer 30 is thinner than second pad layer 28 to permit the quick wear of first pad layer 30. First pad layer 30 has an appreciable thickness of about 0.025 inches to 0.250 inches in thickness, which is greater than the thickness of coatings used in the prior art. Second pad layer 28 has a greater thickness, ranging from about 0.125 inches to over 1 inch in thickness. Second pad layer 28 may be about ten times greater in thickness than first pad layer 30, although this size difference between pad layers is not necessary for the proper function of the brake pad. Second pad layer 28 is preferably made of a commonly used friction material with long-lasting wear characteristics such as a phenol resin. First pad layer 30 may also have some of these characteristics.

When these separate pad layers are combined together, they will share an uneven interface in contrast to a brake pad with a coating, which generally has a uniform interface. FIG. 3 shows uneven interface 32 (shown by shaded region) between first pad layer 30 and second pad layer 28.

Figure 4:
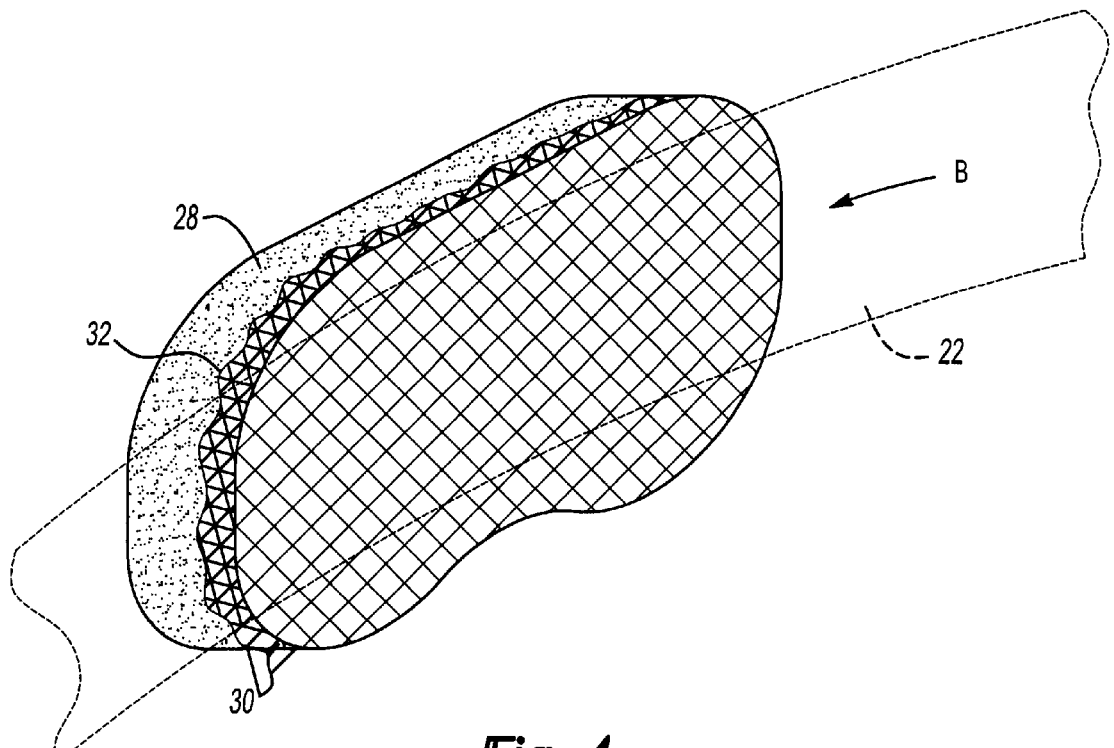
FIG. 4 shows a perspective view of an embodiment of the present invention prior to wearing.
Figure 5:
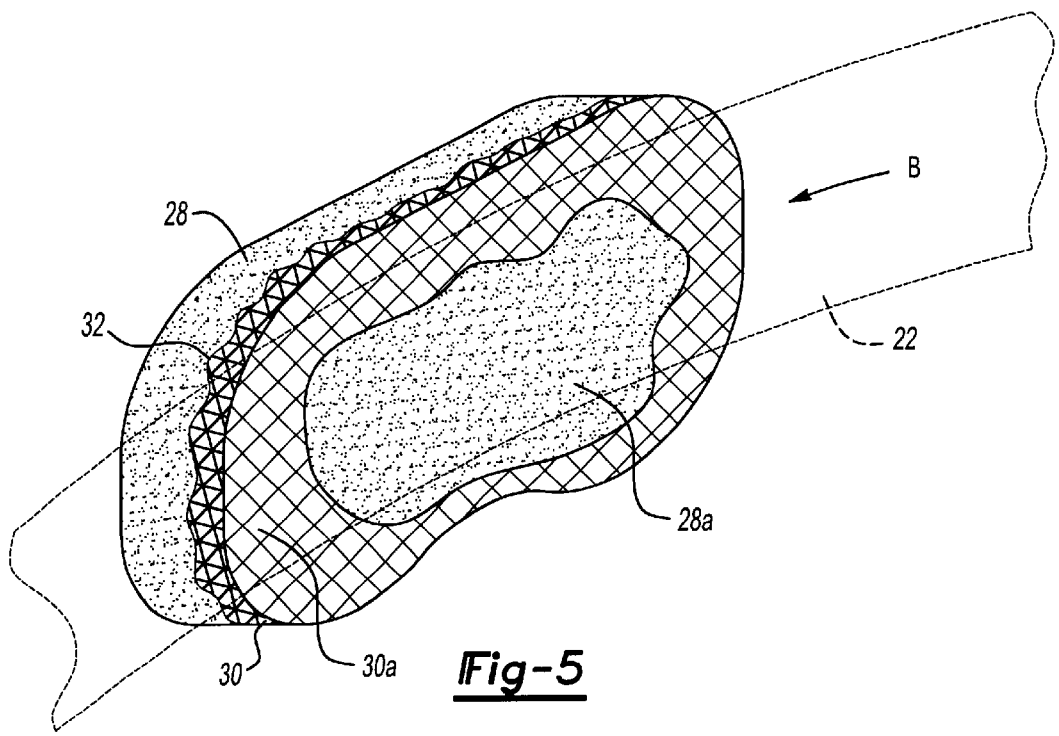
FIG. 5 shows a perspective view of an embodiment of the present invention after some wearing.

As shown in FIGS. 4 and 5, uneven interface 32 contributes to gradual "break-in" of second pad layer 28. FIG. 4 shows a perspective view of an embodiment of the present invention. First pad layer 30 is shown operatively mounted to second pad layer 28. Brake rotor 22 (illustrated by dashed lines) moves in the direction of arrow B and in proximity to first pad layer 30. Here, FIG. 4 shows the present invention prior to any wear of first pad layer 30.

FIG. 5 shows a perspective view of an embodiment of the present invention. When the brake is actuated, brake rotor 22 is in contact with first pad layer 30 and subsequently second pad layer 28 as first pad layer 30 wears away. FIG. 5 illustrates wear on first pad layer 30 caused by brake rotor 22 as the brake rotor 22 rubs against first pad layer 30 in the direction of arrow B. As first pad layer 30 wears away, second pad layer 28 comes into contact with brake rotor 22 and commences to wear or "break-in." Due to uneven interface 32, both pad layers wear unevenly at uneven interface 32. Of course, even with an even surface as may occur, some degree of uneven wear is likely. Such uneven wear may also assist in the gradual "break-in" of the brake pad.

As seen in FIG. 5, at first, only portions 28A of second pad layer show through first pad layer 30 allowing brake rotor 22 to gradually wear second pad layer 28. Hence, portions of the first pad layer 30A continue to offer a higher level of friction as portions of the second pad layer 28A "break-in" gradually to offer the higher level of friction. Eventually, first pad layer 30 wears entirely away, leaving second pad layer 28 already "broken-in" and ready for a long-lasting life.

Figure 6:
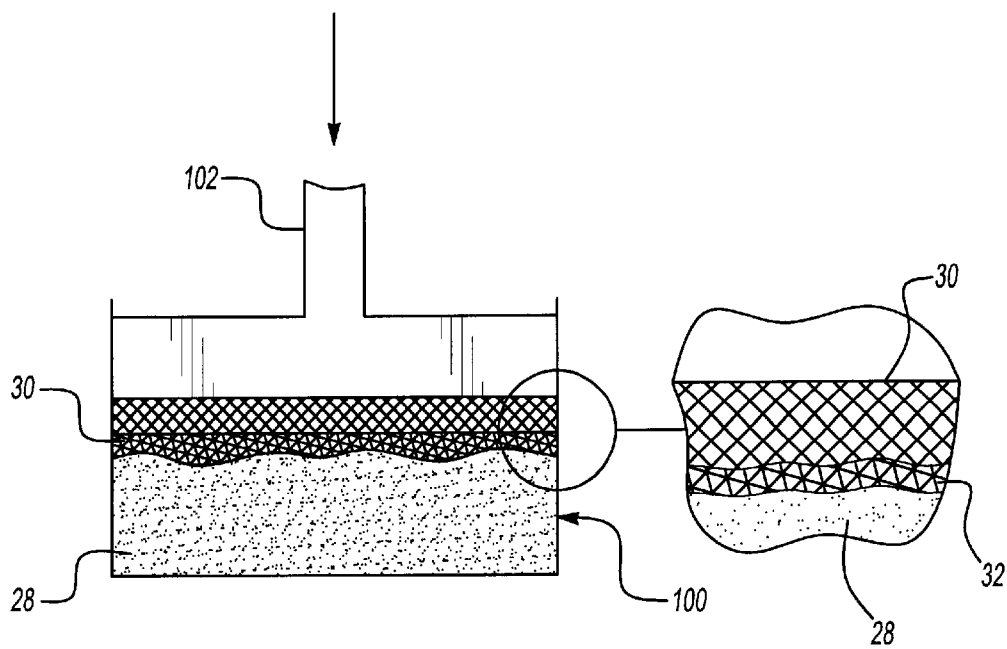
FIG. 6 shows a schematic view of a preferred method of making the present invention.

In contrast to a coating, prior to their assembly, first pad layer 30 and second pad layer 28 may be formed using the same equipment used to form brake pads generally. A brake pad is typically manufactured by inserting friction material into a mold and curing the material until the brake pad is fully formed. This same equipment may be used to create the additional pad layer (first pad layer 30). As schematically shown in FIG. 6, second pad layer 28 of a second friction material is inserted into mold 100 with a common binding agent. First pad layer 30 of a first friction material with the binding agent is then inserted on second pad layer 28. Although not necessary, each pad layer may be then compressed by press 102 as known. Due to differences between first friction material and second friction material especially in consistency, interface 32 between first pad layer 30 and second pad layer 28 will be uneven. The pad layers are then baked together with this unevenness until brake pads are formed together.

In this way, the multi-layered brake pad may be formed without additional equipment or operation in contrast to the use of friction coatings. The assembler simply bonds the two pad layers together using the same equipment used to manufacture brake pads generally. Moreover, there is also no need to monitor the dimensional quality of any coating during the application process because the dimensions of the separate pad layers are easily controlled. More importantly, this method of manufacture ensures the creation of uneven interface 32 that permits the gradual "break-in" of second pad layer 28. Other methods of manufacture known in the art can also provide the same functioning multi-layered brake pad.

Figure 7:
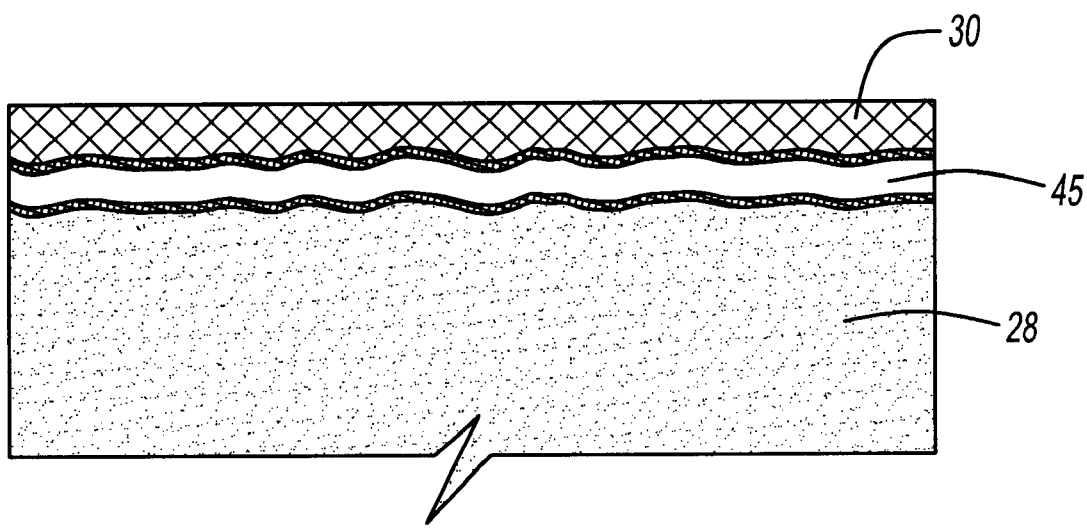
FIG. 7 shows an additional layer between first and second layers.

Indeed, a person with ordinary skill in the art can use different materials for first pad layer 30 and second pad layer 28 to ensure higher and consistent levels of friction throughout the life of the brake pad. For example, a quick wear first pad layer 30 requires second pad layer 28 to have a quicker "break-in" period to offer high levels of friction once first pad layer 30 has worn away. Conversely, a slower wear first pad layer 30 would permit a longer "break-in" period for second pad layer 28 to reach a high level of friction. Moreover, additional pad layers beyond first pad layer 30 and second pad layer 28 may be used to improve the transition between first pad layer 30 and second pad layer 28. As an example, intermediate layer 45 with moderate levels of wear and moderate levels of friction could serve as a transition pad layer between first pad layer 30 and second pad layer 28, as shown in FIG. 7.

The aforementioned description is exemplary rather then limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A brake pad comprising:

a first pad layer made of a first friction material; and a second pad layer made of a second friction material different from said first friction material and operatively mounted to said first friction pad layer wherein said first pad layer has about a higher level of friction initially than said second pad layer and said first pad layer is less wear resistant than said second pad layer and a third pad layer that interfaces between said first pad layer and said second pad layer comprising a third friction material having a level of friction and wear resistance between said first friction material and said second friction material.

2. The brake pad of claim 1 wherein said third pad layer shares an uneven interface with at least one of said first and second pad layers.

3. The brake pad of claim 1 wherein said first pad layer has an appreciable thickness of not less than 0.025 inches.

4. The brake pad of claim 1 wherein said first pad layer has an appreciable thickness of no more than 0.250 inches.

5. The brake pad of claim 1 further comprising a brake plate operatively mounted to said second pad layer.

6. The brake pad of claim 1 wherein said first pad layer comprises organic material.

7. The brake pad of claim 1 wherein said first pad layer comprises metallic material.

8. The brake pad of claim 1 wherein said first pad layer comprises semi-metallic material.

9. The brake pad of claim 1 wherein said first pad layer comprises glass material.

10. The brake pad of claim 1 wherein said first pad layer is significantly thinner than said second pad layer.

* * * * *